(12) United States Patent
Yokokawa et al.

(10) Patent No.: US 10,805,043 B2
(45) Date of Patent: Oct. 13, 2020

(54) DATA TRANSMISSION APPARATUS AND DATA TRANSMISSION METHOD, RECEPTION DEVICE AND RECEPTION METHOD, PROGRAM, AND DATA TRANSMISSION SYSTEM

(71) Applicant: Sony Corporation, Tokyo (JP)

(72) Inventors: Takashi Yokokawa, Kanagawa (JP); Hiroo Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 96 days.

(21) Appl. No.: 15/746,935

(22) PCT Filed: Jul. 15, 2016

(86) PCT No.: PCT/JP2016/071061
§ 371 (c)(1),
(2) Date: Jan. 23, 2018

(87) PCT Pub. No.: WO2017/022463
PCT Pub. Date: Feb. 9, 2017

(65) Prior Publication Data
US 2018/0270015 A1  Sep. 20, 2018

(30) Foreign Application Priority Data

Jul. 31, 2015 (JP) ................................. 2015-152908
Sep. 3, 2015 (JP) ................................. 2015-174152

(51) Int. Cl.
*H04L 1/00* (2006.01)
*G06F 13/42* (2006.01)
*H04W 4/06* (2009.01)

(52) U.S. Cl.
CPC ............ *H04L 1/0041* (2013.01); *G06F 13/42* (2013.01); *H04L 1/00* (2013.01); *H04L 1/0045* (2013.01);
(Continued)

(58) Field of Classification Search
CPC ....... H04L 1/0041; H04L 1/00; H04L 1/0045; H04L 1/0057; H04L 1/0072; G06F 13/42; H04W 4/06
(Continued)

(56) References Cited

U.S. PATENT DOCUMENTS 4,796,025 A * 1/1989 Farley ..................... H04Q 9/14
340/3.4
4,908,629 A * 3/1990 Apsell ..................... G01S 5/02
340/426.15
(Continued)

FOREIGN PATENT DOCUMENTS

JP       05-122163 A    5/1993
JP     2000-099448 A    4/2000
(Continued)

OTHER PUBLICATIONS

Stephen B. Wiker, "Error Control Systems for Digital Communication and Storage", 1995, Prentice Hall, pp. 507, 510, 511, v, vi, vii, x. (Year: 1995).*

*Primary Examiner* — John J Tabone, Jr.
(74) *Attorney, Agent, or Firm* — Michael Best & Friedrich LLP

(57) ABSTRACT

The present disclosure relates to a data transmission apparatus and a data transmission method, a reception. device and a reception. method, a program, and a data transmission system capable of surely switching transmission systems. A transmission unit capable of transmitting data by switching the plurality of transmission systems transmits a switching command for instructing to switch the transmission system. Then, as a measure against an error generated when the switching command is generated, an error correction code for correcting the error generated in the switching command is transmitted or it is confirmed whether the switching command has been successfully received or
(Continued)

reception of the switching command has failed on the basis of the result of error detection relative to the transmitted switching command. The present technology is applied to, for example, a bus IF.

19 Claims, 8 Drawing Sheets

(52) U.S. Cl.
CPC .......... *H04L 1/0057* (2013.01); *H04L 1/0072* (2013.01); *H04W 4/06* (2013.01)

(58) Field of Classification Search
USPC ........ 714/776, 712, 748, 749, 777, 784, 799
See application file for complete search history.

(56) References Cited

U.S. PATENT DOCUMENTS

| | | | | |
|---|---|---|---|---|
| 5,117,430 A | * | 5/1992 | Berglund | H04L 12/403 |
| | | | | 340/635 |
| 5,988,708 A | * | 11/1999 | Frolov | E05B 65/1053 |
| | | | | 292/168 |
| 2013/0067016 A1 | * | 3/2013 | Adkins | H04L 9/0866 |
| | | | | 709/208 |
| 2017/0255588 A1 | * | 9/2017 | Pitigoi-Aron | G06F 13/364 |

FOREIGN PATENT DOCUMENTS

| | | |
|---|---|---|
| JP | 2002-175269 A | 6/2002 |
| JP | 2010-028743 A | 2/2010 |

\* cited by examiner

DATA TRANSMISSION APPARATUS AND DATA TRANSMISSION METHOD, RECEPTION DEVICE AND RECEPTION METHOD, PROGRAM, AND DATA TRANSMISSION SYSTEM

TECHNICAL FIELD

The present disclosure relates to a data transmission apparatus and a data transmission method, a reception device and a reception method, a program, and a data transmission system, and more particularly, to a data transmission apparatus and a data transmission method, a reception device and a reception method, a program, and a data transmission system capable of surely switch transmission systems.

BACKGROUND ART

Traditionally, for example, an inter-integrated circuit (I2C) has been widely used as a bus interface (IF) used for communication between devices via a bus in a board on which a plurality of devices is mounted.

For example, Patent Document 1 discloses a digital data processing system in which a host processor and a subsystem controller are interconnected by the I2C. Furthermore, Patent Document 2 discloses a method which implements a communication protocol layered on top of a standard I2C protocol.

CITATION LIST

Patent Document

Patent Document 1: Japanese Patent Application Laid-Open No. 2000-99448
Patent Document 2: Japanese Patent Application. Laid-Open No. 2002-175269

SUMMARY OF THE INVENTION

Problems to be Solved by the Invention

Meanwhile, an increase in a speed of the I2C has been desired. For example, a plurality of transmission systems having different communication speeds is assumed, and it is assumed to perform communication by switching the transmission systems. As described above, unless it is not possible to surely switch the transmission system in the bus IF capable of switching the transmission system, it is difficult to perform safe communication.

The present disclosure has been made in view of such a situation, and can surely switch the transmission system.

Solutions to Problems

A data transmission apparatus according to a first aspect of the present disclosure includes a transmission unit which is capable of transmitting data by switching a plurality of transmission systems and transmits a switching command for instructing to switch the transmission system and an error measure unit which takes a measure against an error generated when the switching command is transmitted.

A data transmission method or a program according to the first aspect of the present disclosure includes steps of transmitting the switching command for instructing to switch the transmission system and taking a measure against the error generated when the switching command is transmitted.

In the first aspect of the present disclosure, the switching command for instructing to switch the transmission system is transmitted, and the measure against the error generated when the switching command is transmitted is taken.

A reception device according to a second aspect of the present disclosure includes a reception unit which receives a switching command, which is transmitted from a data transmission apparatus capable of transmitting data by switching a plurality of transmission systems, for instructing to switch the transmission system and an error handling unit which performs processing corresponding to a measure against an error, generated when the switching command is transmitted, by the data transmission apparatus.

A data transmission method or a program according to the second aspect of the present disclosure includes steps of receiving a switching command, which is transmitted from a data transmission apparatus capable of transmitting data by switching a plurality of transmission systems, for instructing to switch the transmission system and performing processing corresponding to the measure against the error, generated when the switching command is transmitted, by the data transmission apparatus.

In the second aspect of the present disclosure, the switching command, which is transmitted from the data transmission apparatus capable of transmitting data by switching the plurality of transmission systems, for instructing to switch the transmission system is received, and the processing corresponding to the measure against the error, generated when the switching command is transmitted, by the data transmission apparatus is performed.

A data transmission system according to a third aspect of the present disclosure includes a data transmission apparatus which includes a transmission unit capable of transmitting data by switching a plurality of transmission systems and which transmits a switching command for instructing to switch the transmission system and an error measure unit which takes a measure against an error generated when the switching command is transmitted and a reception device which includes a reception unit which receives the switching command and an error handling unit which performs processing corresponding to the measure by the error measure unit.

In the third aspect of the present disclosure, the switching command for instructing to switch the transmission system is transmitted, and the measure against the error generated when the switching command is transmitted is taken. Furthermore, the switching command is received, and the processing corresponding to the measure against the error is performed.

Effects of the Invention

According to the first to third aspects of the present disclosure, it is possible to surely switch the transmission systems.

MODE FOR CARRYING OUT THE INVENTION

A specific embodiment to which the present technology has been applied is described below in detail with reference to the drawings.

<Exemplary Configuration of Bus IF>

Figure 1:
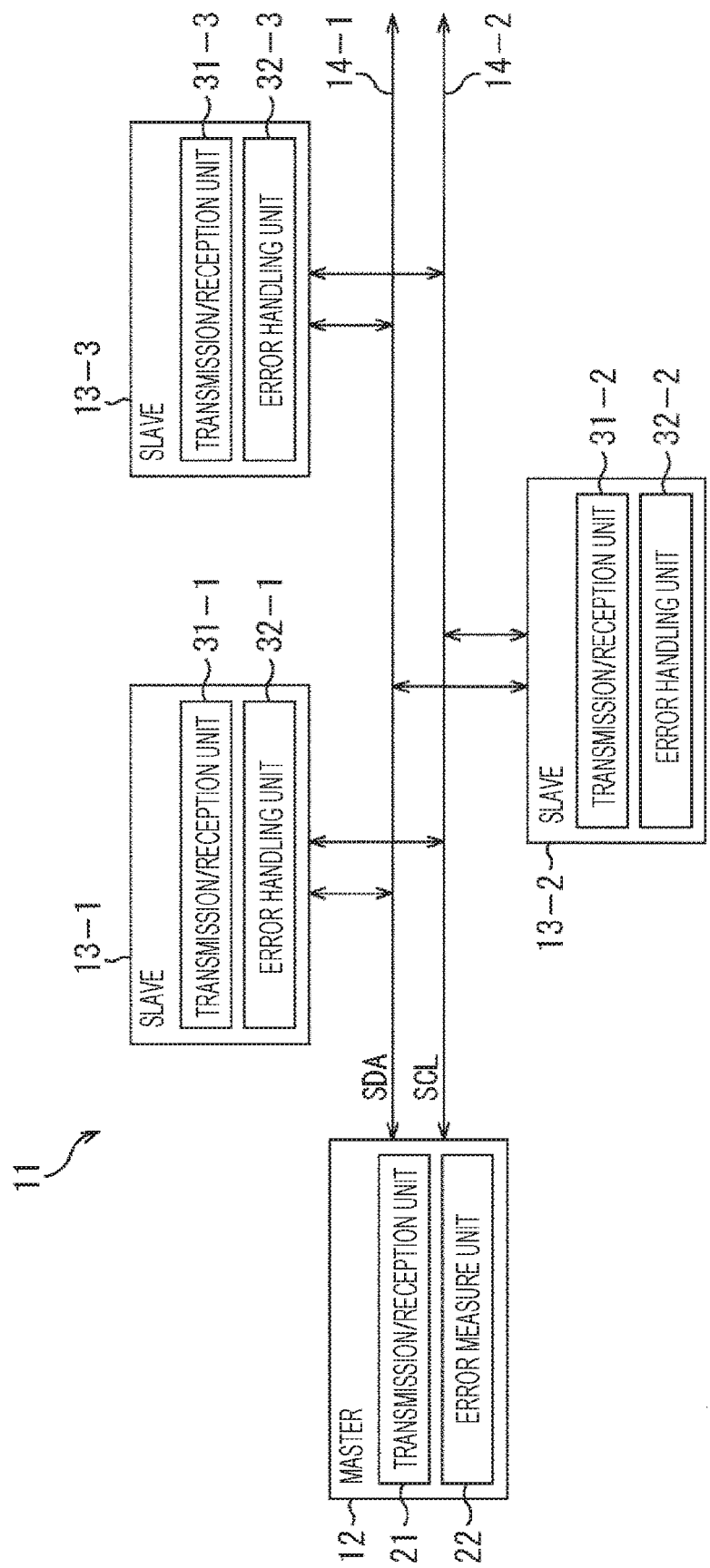
FIG. 1 is a block diagram of an exemplary configuration of an embodiment of a bus IF to which the present technology has been applied.

FIG. 1 is a block diagram of an exemplary configuration of an embodiment of a bus IF to which the present technology has been applied.

A bus IF 11 illustrated in FIG. 1 is configured by connecting a master 12 and three slaves 13-1 to 13-3 via two signal lines 14-1 and 14-2.

The master 12 initiatively controls the bus IF 11 and communicates with the slaves 13-1 to 13-3 via the signal lines 14-1 and 14-2.

The slaves 13-1 to 13-3 can communicate with the master 12 via the signal lines 14-1 and 14-2 under the control by the master 12. Furthermore, the slaves 13-1 to 13-3 are similarly formed, and are simply referred to as a slave 13 below unless it is necessary to distinguish between the slaves.

The signal lines 14-1 and 14-2 are used to transmit data between the master 12 and the slave 13. For example, serial data (SDA) is sequentially transmitted bit by bit via the signal line 14-1, and a serial clock (SCL) having a predetermined frequency is transmitted via the signal line 14-2.

In the bus IF 11 configured in this way, the master 12 can simultaneously transmit data to all the slaves 13-1 to 13-3, and can specify an address of each of the slaves 13-1 to 13-3 to individually transmit data to each of the slaves 113-1 to 13-3.

Furthermore, in the bus IF 11, a plurality of transmission systems with different communication speeds is specified, and the master 12 can switch the transmission systems. For example, in the bus IF 11, according to a data transfer rate, a standard data rate (SDR) for transmitting data at a normal transfer rate and a high data rate (HDR) for transmitting data at a transfer rate higher than the SDR are specified.

That is, a transmission/reception unit 21 included in the master 12 and transmission/reception units 31-1 to 31-3 respectively included in the slaves 13-1 to 13-3 can transmit/receive data by switching the transmission system between the SDR and the HDR. Then, an error measure unit 22 of the master 12 can take a measure against an error generated at the time of transmitting a command (for example, transmission of error correction code and confirmation of parity check result to be described later). Error handling units 32-1 to 32-3 respectively included in the slaves 13-1 to 13-3 can perform processing corresponding to the measure by the error measure unit 22 (for example, decoding by using error correction code and transmission of parity check result).

Figure 2:
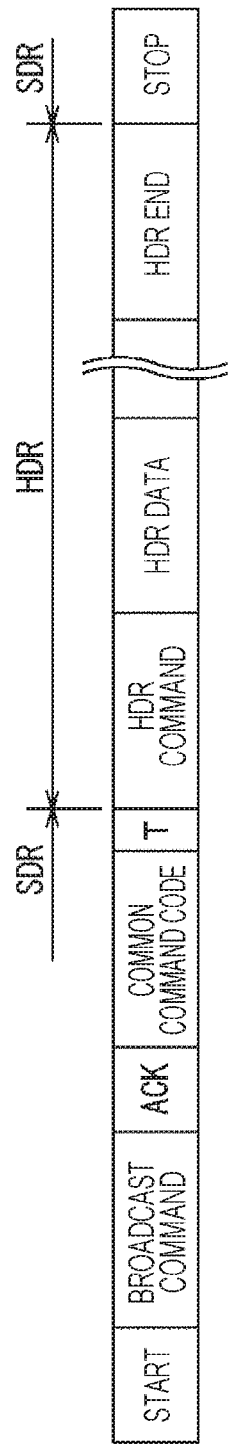
FIG. 2 is a diagram of an example of transmitting data by switching transmission systems.

For example, in FIG. 2, an example is illustrated in which data is transmitted by switching the transmission system from the SDR to the HDR in the bus IF 11.

First, the master 12 sets the bus IF 11 to be in a start condition and declares start of communication. For example, both the SDA and the SCL are set to H level in a standby state in which the communication is not performed in the bus IF 11, and the master 12 sets the bus IF 11 to be in the start condition by changing the level of the SDA from the H level to the L level in a state where the SCL is at the H level. Furthermore, the transmission system at the start of the communication is set to the SDR.

Then, the master 12 transmits a broadcast command which notifies that a command is simultaneously transmitted to all the slaves 13-1 to 13-3, and subsequently confirms whether the command has been successfully received by using an acknowledge (ACK). For example, each of the slaves 13-1 to 13-3 returns an ACK (for example, zero of one bit) as a reception completion notification when the reception of the broadcast command is completed. Therefore, the master 12 confirms that the broadcast command has been successfully received according to the return of the ACK.

After that, the master 12 transmits a common command code, which instructs to switch the transmission system to the HDR, to the slaves 13-1 to 13-3, and subsequently transmits a 1-bit parity. This 1-bit parity is used to detect an error in the common command code in the slaves 13-1 to 13-3.

In this way, after transmitting the common command code, which instructs to switch the transmission system to the HDR, the master 12 starts to transmit data at the HDR and transmits a HDR command, HDR data, and the like. Then, when ending the transmission at the HDR, the master 12 transmits an HDR end command which instructs to exit from the HDR.

After that, the master 12 sets the bus IF 11 to be in a stop condition and declares end of the communication. For example, the master 12 sets the bus IF 11 to be in the stop condition by changing the level of the SDA from the L level to the H level in a state where the SCL is at the H level. Note that, in the bus IF 11, it is specified that the SPA is not changed when the SCL is at the H level, except when the start or the end of the communication is declared, at the time of the SDR.

If one of the slaves 13-1 to 13-3 cannot normally receive the common command code, the slave 13 cannot recognize that the transmission system has been changed to the HDR. Therefore, in a case where the slave 13, which has not been capable of recognizing the that the transmission system has been changed to the HDR, misinterprets the data transmitted at the HDR, this may adversely affect the bus IF 11, and it is assumed that the bus IF 11 cannot perform safety communication.

Furthermore, as illustrated in FIG. 2, the 1-bit parity is added immediately after the common command code. However, the slave 13 can only perform error detection by the 1-bit parity. That is, even if the slave 13 can detect by the 1-bit parity that an error occurs in the received common command code, the slave 13 cannot recognize that the common command code instructs to switch the transmission system to the HDR. Therefore, it is assumed that the slave 13 interpret an HDR signal as the SDR.

Therefore, to surely switch the transmission system, the master 12 takes an error measure in the bus IF 11.

<First Error Measure>

Figure 3:
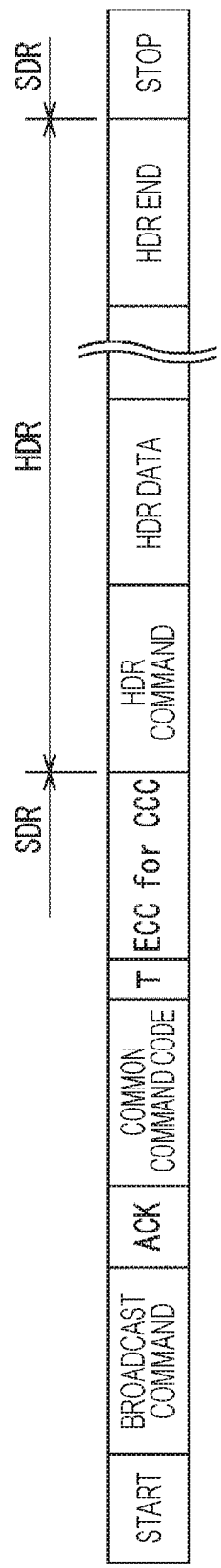
FIG. 3 is a diagram of a first error measure taken when data is transmitted by switching the transmission systems.

In FIG. 3, a first error measure is illustrated which is performed when the data is transmitted by switching the transmission system from the SDR to the HDR in the bus IF 11.

As illustrated in FIG. 3, after setting the bus IF 11 to be in the start condition, the master 12 transmits the broadcast command and confirms whether the command has been successfully received by using the ACK, and transmits the common command code and the 1-bit parity. Then, the master 12 transmits an error correction code (ECC for CCC) for correcting an error generated in the common command code, as a measure against an error, between the transmission of the 1-bit parity and the switching of the transmission system.

That is, after transmitting the common command code and the 1-bit parity, the master 12 transmits the error correction code. After that, the master 12 switches the transmission system from the SDR to the HDR and starts to transmit the HDR command, the HDR data, and the like.

In this way, in the bus IF 11, the master 12 transmits the error correction code for correcting an error generated in the common command code so that the slave 13 can correct the error when the error is generated in the common command code. That is, the error measure unit 22 of the master 12 transmits the error correction code as a measure against the error generated when the common command code is transmitted. On the other hand, the error handling unit 32 of the slave 13 decodes the common command code by using the error correction code as the processing corresponding to the measure by the error measure unit 22. Accordingly, it is possible to prevent that the slave 13 cannot recognize that the transmission system is changed to the HDR by the generation of the error in the common command code, and it is possible to surely switch the transmission system from the SDR to the HDR in the bus IF 11. As a result, safer communication can be performed in the bus IF 11.

For example, as the error correction code, a code is used which has a parity having equal to or less than eight bits and can correct one-bit error. Specifically, the Hamming code, the Reed-Solomon code, and a repetition code are used.

For example, by using the Hamming code (15, 11), one-bit error can be corrected with four-bit parity. Furthermore, by using the Reed-Solomon code ((15, 13) Reed-Solomon code on OF (4)), if there is two-symbol (eight-bit) parity for one-symbol (=four bits), an error of one symbol can be corrected. Furthermore, a shortened code of the Hamming code or a shortened code of the Reed-Solomon code may be used.

Furthermore, with the repetition code, the common command code and the 1-bit parity are transmitted again, and the common command code of which the parity can be correctly obtained by the slave 13 can be employed.

Figure 4:
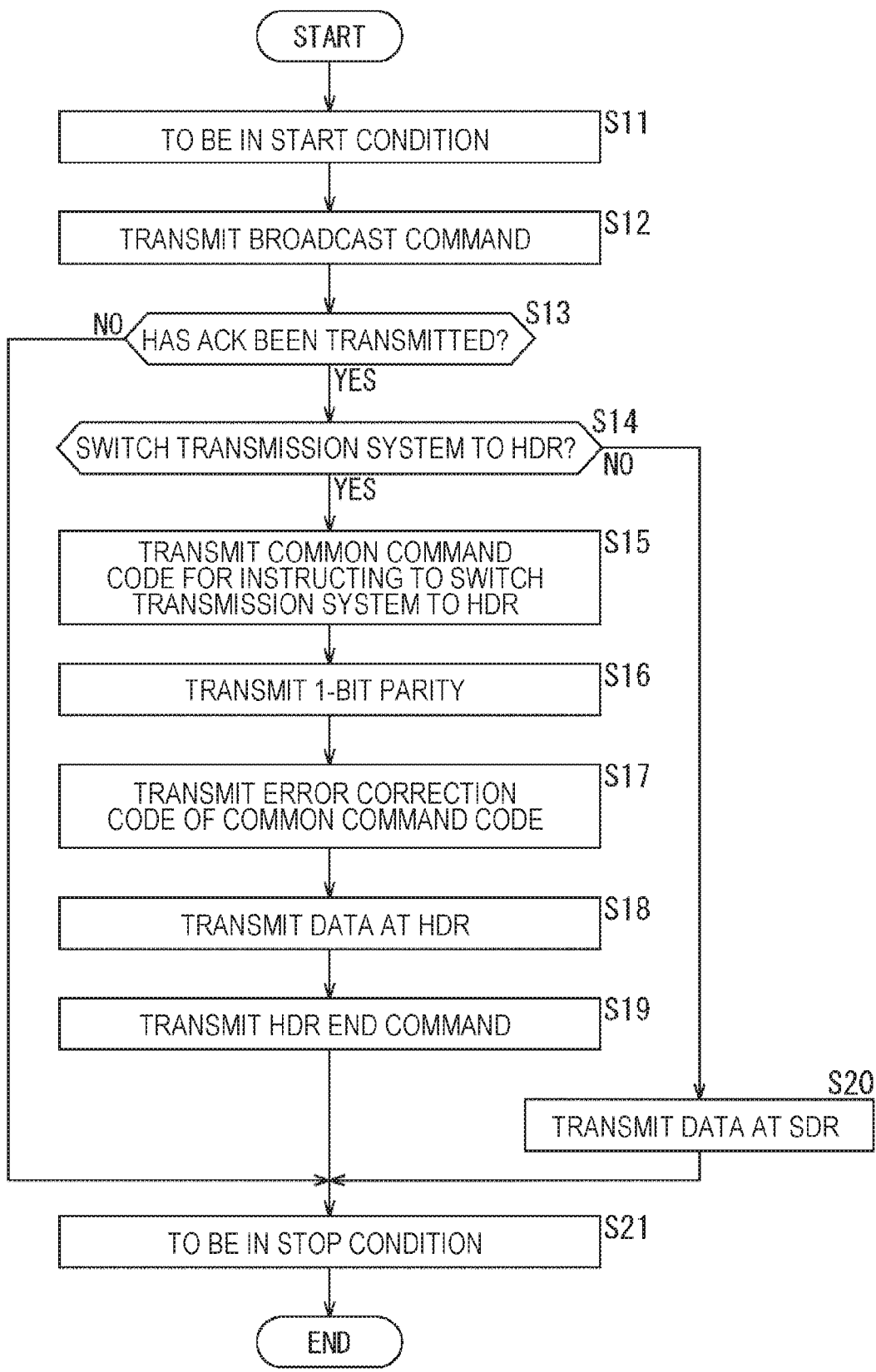
FIG. 4 is a flowchart to describe a first data transmission method.

Next, FIG. 4 is a flowchart to describe a first data transmission method in which the master 12 transmits data by switching the transmission system from the SDR to the HDR.

For example, if an upper controller which is not shown instructs the master 12 to transmit the data, the master 12 sets the bus IF 11 to be in the start condition and declares the start of the communication in step S11.

In step S12, the master 12 transmits the broadcast command. After transmitting the broadcast command, the master 12 waits for the ACK to be transmitted from the slave 13 for a predetermined standby period. Then, the procedure proceeds to step S13.

In step S13, the master 12 determines whether the ACK has been transmitted from the slave 13 in the standby period.

In a case where it has been determined that the ACK has been transmitted from one of the slaves 13, the procedure proceeds to step S14.

In step S14, the master 12 determines whether to switch the transmission system to the HDR. For example, in the bus IF 11, either one transmission system of the SDR or the HDR is set depending on the processing content, and the master 12 can determine whether to switch the transmission system to the HDR according to the current processing content.

In step S14, in a case where the master 12 has determined to switch the transmission system to the HDR, the procedure proceeds to step S15. In step S15, the master 12 transmits the common command code, which instructs to switch the transmission system to the HDR, to the slave 13. In step S16, the master 12 transmits the 1-bit parity relative to the common command code.

In step S17, the master 12 transmits the error correction code for correcting an error generated in the common command code. At this time, the slave 13 performs processing for receiving the common command code and decoding the common command code by using the error correction code.

In step S18, the master 12 switches the transmission system from the SDR to the HDR and transmits data by the HDR. Then, when the transmission of the data by the HDR is completed, the master 12 transmits the HDR end command which instructs to exit from the HDR in step S19.

On the other hand, in a case where the master 12 has determined not to switch the transmission system to the HDR in step S14, the procedure proceeds to step S20, and the master 12 transmits the data by the SDR.

Then, after transmitting the HDR end command in step S19 or after completing the data transmission by the SDR in step S20, the procedure proceeds to step S21. Alternatively, in a case where it has been determined in step S13 that the ACK has not been transmitted from one slave 13, the procedure proceeds to step S21.

In step S21, the master 12 sets the bus IF 11 to be in the stop condition and declares the end of the communication.

As described above, in the bus IF 11, the master 12 can surely switch the transmission system by transmitting the error correction code for correcting the error generated in the common command code.

<Second Error Measure>

Figure 5:
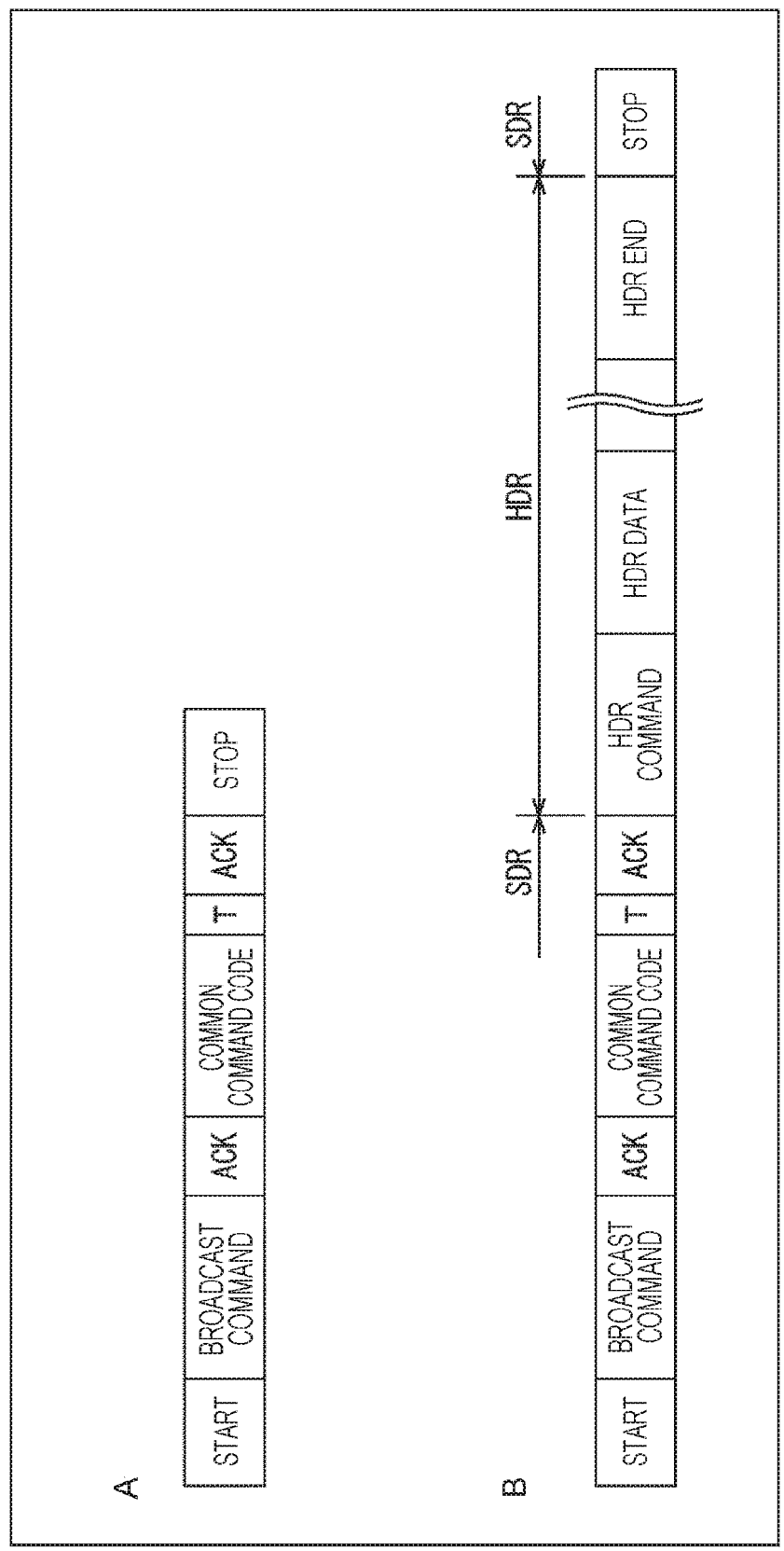
FIG. 5 is a diagram of a second error measure taken when the data is transmitted by switching the transmission systems.

In FIG. 5, a second error measure is illustrated which is performed when the data is transmitted by switching the transmission system from the SDR to the HDR in the bus IF 11.

As illustrated in FIG. 5, after setting the bus IF 11 to be in the start condition, the master 12 transmits the broadcast command and confirms whether the command has been successfully received by using the ACK, and transmits the common command code and the 1-bit parity. Then, the slave 13 performs parity check on the common command code by using the 1-bit parity, and the master 12 waits for a predetermined standby period to wait for transmission of parity check result based on whether the error has been detected in the common command code (parity check success or failure), and confirms (ACK) whether the common command code has been successfully received by using the parity check result.

For example, in a case where any one of the slaves 13-1 to 13-3 transmits the parity check failure, the master 12 determines that there was a slave 13 which has failed to receive the common command code. In this case, as illustrated in A of FIG. 5, the master 12 sets the bus IF 11 to be in the stop condition and declares the end of the communication. Furthermore, in this case, the procedure can be performed again from the start condition.

On the other hand, in a case where all the slaves 13-1 to 13-3 have transmitted the parity check success, the master 12 confirms that the common command code has been successfully received. In this case, as illustrated in B of FIG. 5, the master 12 switches the transmission system from the SDR to the HDR and starts to transmit the HDR command, the HDR data, and the like.

In this way, in the bus IF 11, by confirming whether the command has been successfully received by using the parity check result, the master 12 switches the transmission system from the SDR to the HDR only in a case where all the slaves 13 have successfully received the common command code. That is, the error measure unit 22 of the master 12 confirms the reception success or the reception. failure based on the parity check result by the slave 13 as a measure against the error generated when the common command code is transmitted. On the other hand, the error handling unit 32 of the slave 13 performs the parity check on the common command code as processing corresponding to the measure by the error measure unit 22, and transmits the parity check result (parity check success or parity check failure). Therefore, it is possible to avoid the transmission of the data by the HDR in a state where the slave 13 does not recognize that the transmission system has been changed to the HDR by the generation of the error in the common command code. As a result, in the bus IF 11, it is possible to surely switch the transmission system from the SDR to the HDR and to perform safer communication.

Figure 6:
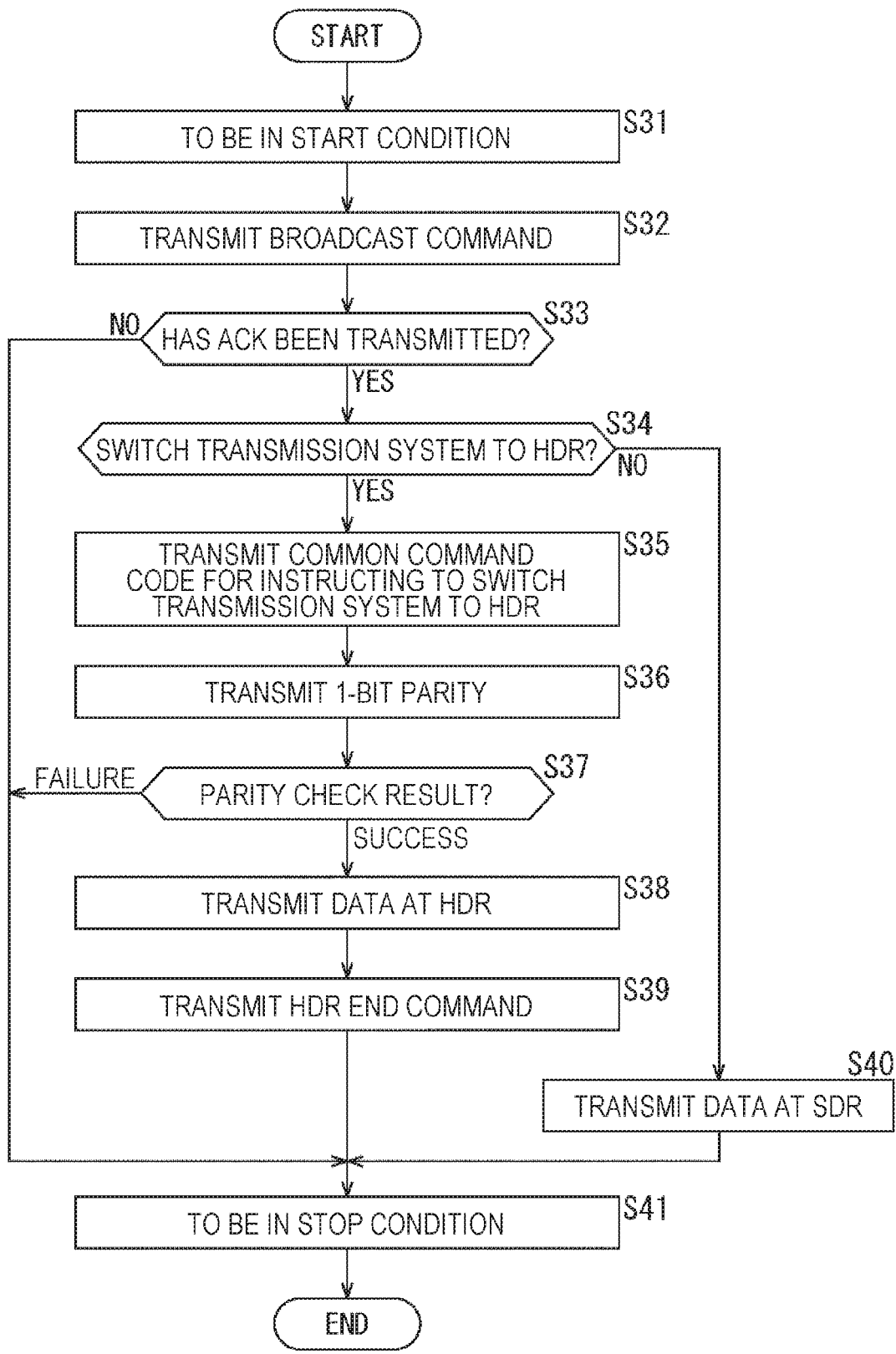
FIG. 6 is a flowchart to describe a second data transmission method.

Next, FIG. 6 is a flowchart to describe a second data transmission method in which the master 12 transmits data by switching the transmission system from the SDR to the HDR.

In steps S31 to S35, the master 12 performs the processing similar to steps S11 to S15 in FIG. 4.

Then, in step S36, after transmitting the 1-bit parity relative to the common command code transmitted in step S35, the master 12 waits for the transmission of the parity check result from the slave 13 for a predetermined standby period, and the procedure proceeds to step S37. At this time, the slave 13 performs processing for receiving the common command code, performing the parity check on the common command code, and transmitting the parity check result.

In step S37, the master 12 determines that the parity check result transmitted from the slave 13 in the standby period indicates the reception success or the reception failure. For example, in a case where all the slaves 13 indicate the parity check success, the master 12 determines that the parity check result indicates the reception success. In a case where any one of the slaves 13 indicates the parity check failure, the master 12 determines that the parity check result indicates the reception failure. Then, in step S37, in a case where the master 12 determines that the parity check result indicates the reception success, the procedure proceeds to step S38.

Then, after completing the data transmission by the HDR in step S38 and transmitting the HDR end command in step S39 or after completing the data transmission by the SDR in step S40, the procedure proceeds to step S41. Furthermore, in a case where it has been determined in step S33 that no ACK has been transmitted from any one of the slaves 13 or in a case where it has been determined that the parity check result indicates the reception failure in step S37, the procedure proceeds to step S41.

In step S41, the master 12 sets the bus IF 11 to be in the stop condition and declares the end of the communication.

As described above, in the bus IF 11, the master 12 can surely switch the transmission system by confirming whether the command has been successfully received by using the parity check result.

<Measure against Broadcast Command>

Next, an error measure against an error generated in the broadcast command is described with reference to FIG. 7.

As described above, in the bus IF 11, after setting the bus IF 11 to be in the start condition, the master 12 transmits the broadcast command which notifies that a command is simultaneously transmitted to all the slaves 13-1 to 13-3. At this time, in a case where the error generated in the broadcast command, the slaves 13-1 to 13-3 cannot accurately recognize the common command code which is transmitted after the broadcast command. Therefore, it is assumed that the transmission system cannot be surely switched according to the common command code and safe communication cannot be performed.

Therefore, in the bus IF 11, to surely switch the transmission system, the error measure unit 22 of the master 12 takes a measure against the error in the broadcast command, and the error handling unit 32 of the slave 13 copes with the error measure.

Figure 7:
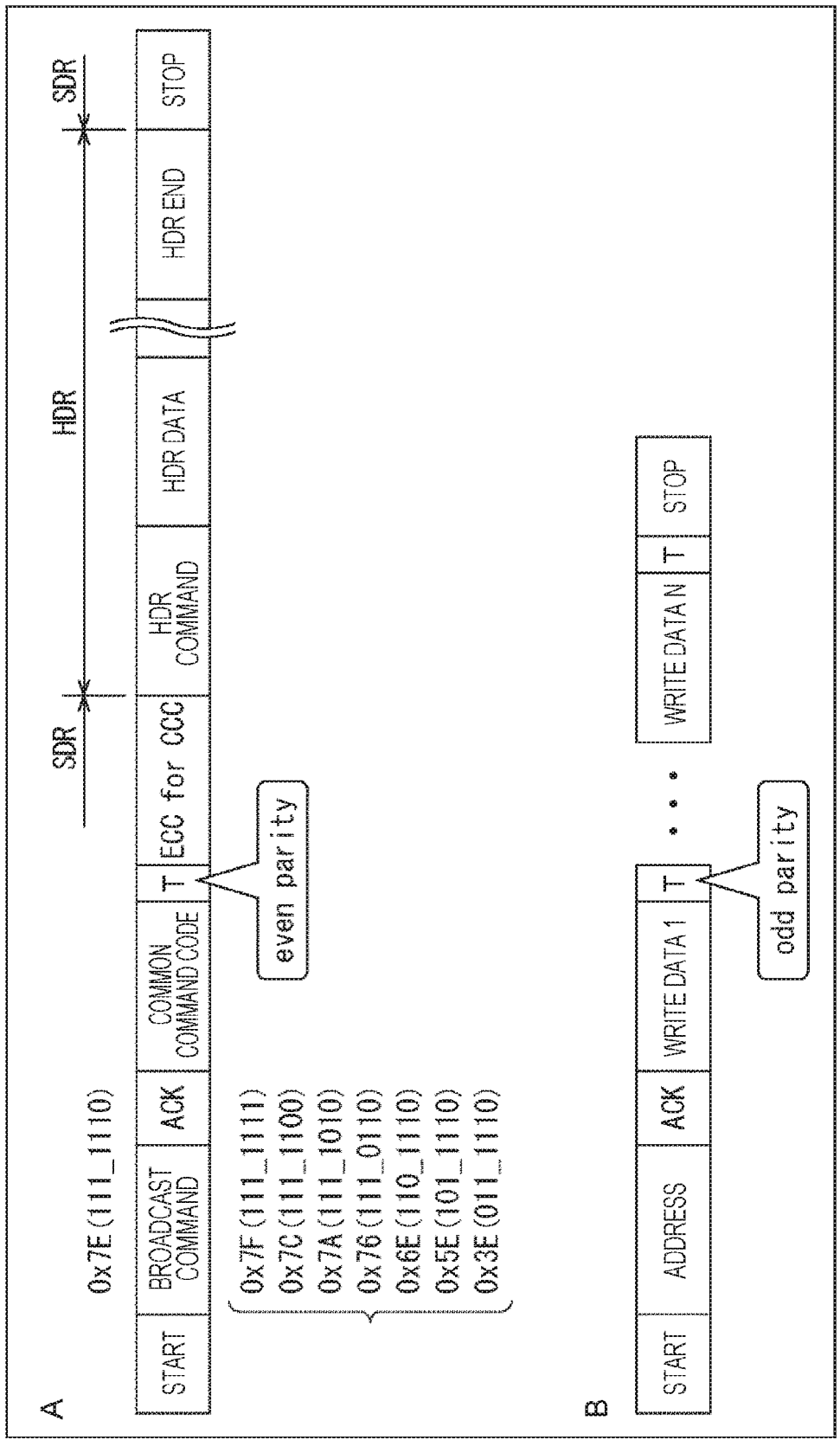
FIG. 7 is a diagram to describe a measure against an error in a broadcast command.

In A of FIG. 7, similarly to FIG. 3, a signal including the error correction code (ECC for CCC) for correcting the error generated in the common command code is illustrated. In B of FIG. 7, as an example other than the processing for switching the transmission system according to the common command code, a signal in processing for specifying an address and transmitting write data is illustrated.

For example, as described above with reference to FIG. 3, when transmitting the data by switching the transmission system from the SDR to the HDR, the master 12 sets the bus IF 11 to be the start condition, and then transmits the broadcast command. At this time, as illustrated in A of FIG. 7, in the bus IF 11, it is defined that the broadcast command is represented by a 7-bit bit string of 0×7E (111_1110).

On the other hand, as illustrated in B of FIG. 7, when data is written from the master 12 to the slave 13 in the bus IF 11, the master 12 transmits an address to be a write destination of the data after setting the bus IF 11 to be in the start condition. After that, the master 12 confirms whether the command has been successfully received by using the ACK, and transmits write data N which is Nth data from a first write data 1.

Therefore, in a case where any one bit of the 7-bit bit string of 0×7E (111_1110) transmitted as the broadcast command is inverted by the error, it is assumed that the slave 13 wrongly recognize the broadcast command in which the error has been generated as the address and perform subsequent processing.

Therefore, as the measure against such an error, it is defined that a bit string is not available, in which any one bit of the 7-bit bit string of 0×7E (111_1110) representing the broadcast command is inverted, as an address. That is, as illustrated in A of FIG. 7, it is defined that seven types of bit strings 0×7F (111_1111), 0×7C (111_1100), 0×7A (111_1010), 0×76 (111_0110), 0×6E (110_1110), 0×5E (101_1110), and 0×3E (011_1110) are not available as an address, which have Hamming distance 1 from the bit string of 0×7E (111_1110) representing the broadcast command.

In addition to this, it is defined that an even parity is used for the 1-bit parity transmitted subsequently to the common command code. For example, in the bus IF 11, it is defined that an odd parity is normally used for the 1-bit parity used for transmission of a code other than the common command code.

In this way, it is defined that the bit string having the Hamming distance 1 from the 7-bit bit string of 0x7E (111_1110) representing the broadcast command is not available as an address, and it is defined that an even parity is used for the 1-bit parity transmitted subsequently to the common command code. As a result, in the bus IF 11, even if a 1-bit error is generated in the broadcast command, the generation of the error can be detected, and the common command code can be accurately recognized.

That is, in a case where the slave 13 receives one of the seven kinds of bit strings having Hamming distance 1 from the bit string of 0x7E (111_1110) and the 1-bit parity received subsequently to the common command code is an even parity, it can be determined that the error has been generated in the broadcast command. Therefore, in this case, by determining that the received bit string is the broadcast command, the slave 13 can accurately recognize the common command code and can transmit the data by switching the transmission system from the SDR to the HDR.

Furthermore, for example, in a case where the slave 13 receives one of the seven kinds of bit strings having Hamming distance 1 from the bit string of 0x7E (111_1110) and the 1-bit parity received subsequently to the common command code is an odd parity, the slave 13 performs processing while recognizing that the received bit string is not the broadcast command.

As described above, in the bus IF 11, the error measure unit 22 of the master 12 prohibits the use of the bit string having Hamming distance 1 from the 7-bit bit string of 0x7E (111_1110) representing the broadcast command as an address. Then, the transmission/reception unit 21 of the master 12 sets the bus IF 11 to be in the start condition and transmits the broadcast command. After that, the transmission/reception unit 21 uses an even parity as the 1-bit parity transmitted subsequently to the common command code.

On the other hand, in a case where the 1-bit parity which is received subsequently to the common command code is an odd parity after the bus IF 11 has been set to be in the start condition and the transmission/reception unit 31 has received the bit string having Hamming distance 1 from the 7-bit bit string of 0x7E (111_1110) representing the broadcast command, the error handling unit 32 of the slave 13 can accurately recognize the common command code by determining that the 7-bit bit string which has been received by the transmission/reception unit 31 is the broadcast command.

By taking such a measure against an error in the broadcast command, it is possible to surely switch the transmission system in the bus IF 11 according to the common command code transmitted after the broadcast command. As a result, safer communication can be performed in the bus IF 11.

Furthermore, by taking the error measure with respect to the broadcast command, is possible to avoid delays in the processing in comparison with a configuration in which the broadcast command is retransmitted when an error is generated in the broadcast command.

Furthermore, the error measure with respect to the broadcast command described above is not limited to the unavailability of the bit string in which one bit is inverted from the 7-bit bit string of 0x7E (111_1110) representing the broadcast command. For example, in a case where it is assumed that an error of two or more bits be generated in the broadcast command, a bit string in which two or more bits are inverted from the 7-bit bit string of 0x7E (111_1110) representing the broadcast command may be unavailable.

In addition, regarding the 1-bit parity, an even parity and an odd parity may be used as inverted from those in the description above, and it is preferable that a 1-bit parity different from those in the other cases be used only when the common command code is transmitted.

Note that the present technology is not limited to the bus IF 11 conforming to the I2C standard, and can be applied to buses IF 11 according to other standards. Furthermore, in the bus IF 11 illustrated in FIG. 1, an exemplary configuration in which the slaves 13-1 to 13-3 are connected to each other is illustrated. However, the number of slaves 13 may be, for example, one or two, or equal to or more than three. In addition, for example, the bus IF 11 may use a combination of both the transmission of the error correction code for correcting the error generated in the common command code and the confirmation of the reception success by using the parity check result.

Note that it is not necessary for the processing described above with reference to the flowcharts to be executed in time series in an order described in the flowchart, and the processing described above includes processing which is executed in parallel or processing which is individually executed (for example, parallel processing or processing by object)). Furthermore, the program may be executed by a single CPU, and may be distributively processed by a plurality of CPUs.

Furthermore, the series of processing can be executed by hardware and software. In a case where the software executes the series of processing, a program included in the software is installed from a program recording media, in which the program has been recorded, to a computer installed in a dedicated hardware or, for example, a general-purpose personal computer which can perform various functions by installing various programs.

<Exemplary Hardware Configuration>

Figure 8:
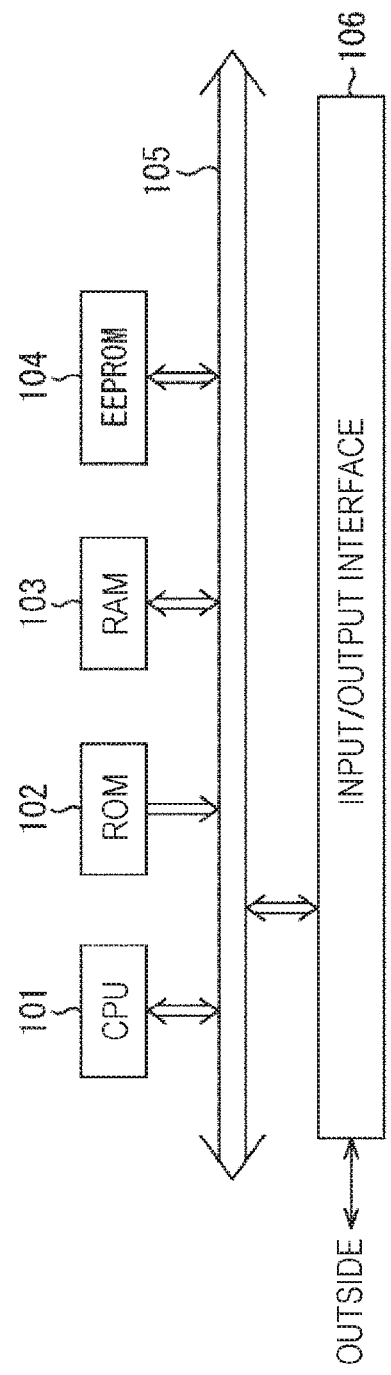
FIG. 8 is a block diagram of an exemplary configuration of an embodiment of a computer to which the present technology has been applied.

FIG. 8 is a block diagram of an exemplary configuration of hardware of the computer for executing the above-mentioned series of processing by the program.

In the computer, a central processing unit (CPU) 101, a read only memory (ROM) 102, a random access memory (RAM) 103, and an electronically erasable and programmable read only memory (EEPROM) 104 are connected to each other with a bus 105. In addition, an input/output interface 106 is further connected to the bus 105, and the input/output interface 106 is connected to the outside (for example, signal lines 14-1 and 14-2 in FIG. 1).

In the computer configured as described above, the CPU 101 loads and executes, for example, a program stored in the ROM 102 and the EEPROM 104 to the RAM 103 via the bus 105 so that the series of processing described above is executed. Furthermore, the program executed by the computer (CPU 101) can be previously written in the ROM 102, installed in the EEPROM 104 from outside via the input/output interface 106, or updated.

Note that, the present technology can have the configuration below.

(1) A data transmission apparatus including:
a transmission unit configured to be capable of transmitting data by switching a plurality of transmission systems and transmit a switching command for instructing to switch the transmission system; and
an error measure unit configured to take a measure against an error generated when the switching command is transmitted.

(2) The data transmission apparatus according to (1), in which
the error measure unit transmits an error correction code for correcting the error generated in the switching command.

(3) The data transmission apparatus according to (2), in which
as the error correction code, a Hamming code or a shortened code of the Hamming code is used.

(4) The data transmission apparatus according to (2), in which
as the error correction code, a Reed-Solomon code or a shortened code of the Reed-Solomon code is used.

(5) The data transmission apparatus according to (2), in which
as the error correction code, a repetition code is used.

(6) The data transmission apparatus according to any one of (1) to (5), in which
the error measure unit performs confirmation by using a reception completion notification which is transmitted when reception of the switching command has been completed.

(7) The data transmission apparatus according to (6), in which
the error measure unit provides a predetermined standby period in which the error measure unit waits after transmitting the switching command and determines whether the reception completion notification has been transmitted in the standby period.

(8) The data transmission apparatus according to any one of (1) to (7), in which
the error measure unit prohibits use of a predetermined number of bit strings in which at least one bit is inverted in the predetermined number of bit strings representing a broadcast command for notifying that a command is simultaneously transmitted to all of a plurality of reception devices, and
after transmitting the broadcast command, the transmission unit makes the error correction code transmitted subsequently to the switching command be different from an error correction code used to transmit a command other than the switching command.

(9) A data transmission method of a data transmission apparatus including a transmission unit capable of transmitting data by switching a plurality of transmission systems, the method including steps of:
transmitting a switching command for instructing to switch the transmission system; and
taking a measure against an error generated when the switching command is transmitted.

(10) A program to be executed by a computer of a data transmission apparatus including a transmission unit capable of transmitting data by switching a plurality of transmission systems, including steps of:
transmitting a switching command for instructing to switch the transmission system; and taking a measure against an error generated when. the switching command is transmitted.

(11) A reception device including:
a reception unit configured to receive a switching command, which is transmitted from a data transmission apparatus capable of transmitting data by switching a plurality of transmission systems, for instructing to switch the transmission system; and
an error handling unit configured to perform processing corresponding to a measure against an error, generated when the switching command is transmitted, by the data transmission apparatus.

(12) The reception device according to (11), in which
the error handling unit performs processing for decoding the switching command by using an error correction code which is transmitted as a measure by the data transmission apparatus.

(13) The reception device according to (11) or (12), in which
the error handling unit detects an error in the switching command and performs processing of transmitting the error detection result to confirm whether the switching command has been successfully received or reception of the switching command has failed as the measure by the data transmission apparatus.

(14) The reception device according to any one of (11) to (13), in which
in a case where the error correction code received subsequently to the switching command is different from an error correction code used to transmit a command other than the switching command after the reception unit has received a predetermined number of bit strings in which at least one bit is inverted from the predetermined number of bit strings representing a broadcast command for notifying that a command is simultaneously transmitted to ail of the plurality of reception devices, the error handling unit determines that the predetermined number of strings in which at least one bit is inverted from predetermined number of bit strings representing the broadcast command is the broadcast command.

(15) A reception method including steps of:
receiving a switching command, which is transmitted from a data transmission apparatus capable of transmitting data by switching a plurality of transmission systems, for instructing to switch the transmission system; and
performing processing corresponding to a measure against an error, generated when the switching command is transmitted, by the data transmission apparatus.

(16) A program including steps of:
receiving a switching command, which is transmitted from a data transmission apparatus capable of transmitting data by switching a plurality of transmission systems, for instructing to switch the transmission system; and
performing processing corresponding to the measure against an error, generated when the switching command is transmitted, by the data transmission apparatus.

(17) A data transmission system including:
a data transmission apparatus including a transmission unit capable of transmitting data by switching a plurality of transmission systems and which transmits a switching command for instructing to switch the transmission system and as error measure unit which takes a measure against an error generated when the switching command is transmitted; and
a reception device including a reception unit which receives the switching command and an error handling unit which performs processing corresponding to the measure by the error measure unit.

In addition, the embodiment is not limited to the embodiment described above and can be variously changed without departing from the scope of the present disclosure.

REFERENCE SIGNS LIST

11 Bus IF
12 Master
13-1 to 13-3 Slave
14-1 and 14-2 Signal line
21 Transmission/reception unit
22 Error measure unit
31-1 to 31-3 Transmission/reception unit
32-1 to 32-3 Error handling unit

The invention claimed is:
1. A data transmission apparatus comprising:
a master device that is electronically connectable to a transmission system, wherein the master device is configured to:
determine whether the transmission system is to switch from a system that transfers data at a first data rate to a system that transfers the data at a second data rate,
transmit to reception devices that are electrically connected to the transmission system, after the master device determines that the transmission system is to switch from the system that transfers the data at the first data rate to the system that transfers the data at the second data rate, a common command code that instructs switching of the transmission system to the second data rate, and
transmit onto the transmission system, after the master device transmits the common command code to the reception devices, an error correction code that permits any of the reception devices to process the error correction code in a manner that causes said any of the reception devices to correct an error in the common command code.

2. The data transmission apparatus according to claim 1, wherein the second data rate is higher than the first data rate.

3. The data transmission apparatus according to claim 1, wherein the master device is configured to:
transmit to the receptioin devices that are electrically connected to the transmission system, after the master device transmits the common command code that before the master device transmits the error correction code, a parity bit that permits said any of the reception devices to perform a parity check that detects the error in the common command code.

4. The data transmission apparatus according to claim 3, wherein the master device is configured to:
determine, after the master device receives the parity check result from said any of the reception devices, whether a result of the parity check indicates that said any of the reception devices has received the common command code without the error in the common command code.

5. The data transmission apparatus according to claim 4, wherein the master device is configured to:
switch, after the master device determines the parity check result to indicate that said any of the reception devices has refceived the common command code without the error in the common command code, the transmission system to the second data rate.

6. The data transmission apparatus according to claim 4, wherein the master device is configured to:
provide, after the master device determines the parity check result to indicate that said any of the reception devices has reeived the common command code without the error in the common command code.

7. The data transmission apparatus according to claim 1, wherein the master device is configured to:
determine, after the master device receives an acknowledge from said any of the reception devices that a broadcast command has been received by said any of the reception devices, whether the transmission system is to switch from the system that transfers the data at the first data rate to the system that transfers the data at the second data rate.

8. The data transmission apparatus according to claim 7, wherein the master device is configured to:
transmit, onto the transmission system, the broadcast command.

9. The data transmission apparatus according to claim 7, wherein the master device is configured to:

prohibit, in the broadcast command, use of a predetermined number of bit strings in which at least one bit is inverted.

10. The data transmission apparatus according to claim 1, wherein the master device is configured to:
transmit onto the transmission system, after the master device determines that the transmission system is not to switch from the system that transfers the data at the first data rate to the system that transfers the data at the second data rate, the data at the first data rate.

11. A data transmission system comprising:
the data transmission apparatus according to claim 1, and said any of the reception devices.

12. A data transmission method comprising:
determining, by a master device that is electronically connectable to a transmission system, whether the transmission system is to switch from a system that transfers data at a first data rate to a system that transfers the data at a second data rate;
transmitting to reception devices that are electrically connected to the transmission system, by the master device after the master device determines that the transmission system is to switch from the system that transfers the data at the first data rate to the system that transfers the data at the second data rate, a common command code that instructs switching of the transmission system to the second data rate, and
transmitting onto the transmission syste, by the master device after the master device transmits the common command code to the reception devices, an error correction code that permits any of the reception devices to process the error correction code in a manner that causes said any of the reception devices correct an error in the common command code.

13. The data transmission method according to claim 12, wherein the second data rate is higher than the first data rate.

14. A non-transitory data storage device having program code embodied thereon, the computer code when executed by the master device performs the data transmission method according to claim 12.

15. A reception device comprising:
a reception device that is electrtonically connectable to a transmission syste,
wherein the reception device is configured to:
receive, from a data transmission apparatus that is electrically connected to the transmission system, a common command code that instructs switching of the transmission system form a system that transfers data at a first data rate to the system that transfers the data at a second data rate,
receive, from the data transmission apparatus after the reception device receives the common command code, an error correction code, and
process, after the reception device receives the error correction code, the error correction code in a manner that causes the reception device to correct an error in the common command code.

16. The reception device according to claim 15, wherein the second data rate is higher than the first data rate.

17. A reception method comprising:
receiving, by a reception device from a data transmission apparatus, a common command code that instructs switching of a transmission system from a system that transfers data at a first data rate to the system that transfers the data at a second data rate, and
receiving, from the data transmission apparatus after the reception device receives the common command code, an error correction code that permits the reception device to correct an error in the common command code, wherein the reception device and the data transmission apparatus are electrically connected to the transmission system.

18. The reception method according to claim 17, wherein the second data rate is higher than the first data rate.

19. A non-transitory data storage device having program code embodied thereon, the computer code when executed by the reception device performs the reception method according to claim 17.

\* \* \* \* \*